United States Patent
Moore

(10) Patent No.: US 7,836,021 B2
(45) Date of Patent: Nov. 16, 2010

(54) METHOD AND SYSTEM FOR MANAGING IMAGE FILES IN A HIERARCHICAL STORAGE MANAGEMENT SYSTEM

(75) Inventor: John A. Moore, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1302 days.

(21) Appl. No.: 10/758,061

(22) Filed: Jan. 15, 2004

(65) Prior Publication Data

US 2005/0165796 A1    Jul. 28, 2005

(51) Int. Cl.
*G06F 7/00* (2006.01)
*G06F 17/00* (2006.01)

(52) U.S. Cl. .................. 707/661; 707/758; 707/913

(58) Field of Classification Search .......... 707/102; 382/154, 166
See application file for complete search history.

(56) References Cited

U.S. PATENT DOCUMENTS

| | | | |
|---|---|---|---|
| 5,218,431 A * | 6/1993 | Gleicher et al. ........... 348/472 |
| 5,584,008 A | 12/1996 | Shimada et al. | |
| 5,974,182 A * | 10/1999 | Bryniarski et al. .......... 382/232 |
| 6,330,572 B1 * | 12/2001 | Sitka ........................ 707/205 |
| 7,020,658 B1 * | 3/2006 | Hill ............................ 707/102 |
| 2001/0014172 A1 * | 8/2001 | Baba et al. ................ 382/154 |
| 2002/0037100 A1 * | 3/2002 | Toda et al. ................ 382/166 |

* cited by examiner

*Primary Examiner*—John E Breene
*Assistant Examiner*—Giovanna Colan
(74) *Attorney, Agent, or Firm*—Maginot, Moore & Beck LLP

(57) ABSTRACT

A system evaluates file metadata for files maintained in the secondary storage of a host system to determine whether one or more image files are to be downgraded. The image files selected for downgrading are reduced in size by one or more downgrading operations. The resulting file is stored in secondary storage so an image file remains in secondary storage that does not require the memory space of the previous image file. The downgrade operations may include lossless compression, lossy compression, bit depth reduction, resolution reduction, color palette, binary imaging, or a combination of a plurality of downgrade operations.

9 Claims, 2 Drawing Sheets

METHOD AND SYSTEM FOR MANAGING IMAGE FILES IN A HIERARCHICAL STORAGE MANAGEMENT SYSTEM

FIELD OF THE INVENTION

The present invention relates generally to file management systems, and more particularly, to hierarchical storage management systems.

BACKGROUND OF THE INVENTION

Computers require storage for data and programs so they may properly operate and generate the results for which they have been programmed. Typically, a computer includes program memory for the storage of programs that are executed by one or more processors associated with a computer. Program memory may be read only or read/write memory. The access times for program memory are typically short because requiring a processor to wait for retrieval of instructions to execute results in a reduction in throughput for the computer. Some programs may reside in memory having short access times while others may be stored in memory having longer access time, such as a disk drive or the like. Programs stored on disks are typically retrieved when required for execution, loaded into higher speed memory, and executed. In this manner, programs remain available for execution without requiring permanent storage in the program memory having shorter access time.

A similar philosophy has been implemented with hierarchical storage management systems (HSMs). In these systems, files are stored in different types of media having various access times to reduce the need for storing all of the files in the type of media require to support the throughput necessary for efficient utilization of the computer's resources. Typically, HSMs migrate files that are less frequently accessed or that have not been accessed for some defined period of time from secondary storage, such as hard disks, to tertiary storage, such as magneto-optical disks or a tape library. When a program attempts to access a file that is maintained on tertiary media, the HSM moves the file from tertiary storage to secondary storage for access by the requesting program. The file remains in secondary storage until the condition for file migration occurs and the file is returned to tertiary storage.

As image resolution rates for grayscale and color images have increased so have the memory requirements for storing image files. Also, the growing use of color images has expanded the need for more storage space in computers. As the size of image files has grown, the number of image files that may be stored in secondary memory of a computer has decreased. The amount of memory available for files in secondary storage is an important parameter for determining when to migrate files in HSMs. In any HSM, the system needs to maintain a portion of secondary storage space for new files being generated by application programs and for migrating files from tertiary storage to secondary storage as they are requested by application programs. Incoming image files may quickly consume available secondary storage for a computer.

There is a need, therefore, for an apparatus and method for managing image files in an HSM that reduces the memory required for storage of multiple image files in secondary storage.

SUMMARY OF THE INVENTION

The present invention addresses the above need, as well as others, by providing a method for downgrading image files maintained in secondary storage so that the files do not consume as much storage as a full resolution version of the image file. The downgrading of the image files preferably occurs at discrete levels based upon one or more criteria. A downgraded image file may be upgraded upon request from a program.

An exemplary method of image file management includes identifying an image file stored in secondary storage, downgrading the identified file, and storing the downgraded file in secondary storage. In some implementations, the identified file is stored in tertiary storage before being downgraded so a full resolution version of the image file remains available for upgrading or for further downgrading.

Downgrading of an image file may include one or more of the following methods: bit depth reduction, lossless compression methods, lossy compression methods, resolution reduction, and color downgrading. Bit depth reduction is a reduction in the number of bits used to represent a pixel in the image. Lossy compression methods include discrete cosine transform (DCT) methods such as JPEG and MPEG methods. These lossy compression methods may be tweaked by using various Q factors in the compression implementation. Resolution reduction refers to the number of pixels used to represent a row or a column in a raster version of an image. Color downgrading occurs when a color scheme is reduced from one color image format to another that requires less data for the representation of color data. For example, a four color CMYK representation may be downgraded to a three color representation such as RGB, CIE L*a*b, CIE L*u*v, or CIE XYZ. These images may be further downgraded to duotone, which may be further downgraded to color palette, for example. Also, image file downgrading may include a combination of file size reduction methods.

Identification of a file for downgrading may be based upon a number of criteria. In one implementation, the last time of file access may be compared to an access time threshold. If the length of time since the last file access exceeds the access time threshold, the file is identified for purposes of downgrading. Another method for identifying files requires determining the frequency of file access during a time period and comparing that frequency to an access frequency threshold. If the access frequency is less than the frequency threshold then the file is identified for downgrading. File identification may also be determined with regard to file classification. Image files may be assigned various ranks that correlate to different frequency or access time thresholds. In this manner, the purposes for which the image files are stored on the computer may be taken into account. For example, medical image files may be assigned a rank that correlates to a threshold that precludes the HMS from downgrading the file before a web art file. Classification data may also include indicators as to whether an image is active or archival. For example, document images for an active insurance claim being processed may not be as aggressively downgraded as an archival copy of a finally adjudicated insurance claim.

A system for performing an implementation of an exemplary method of image file management includes a file selector for identifying an image file stored in secondary storage and a file reducer for downgrading the identified file. In some implementations, the file selector may store an identified file in tertiary storage before being downgraded so a full resolution version of the image file remains available for upgrading or for further downgrading.

The file reducer may include an image bit depth reducer, a compressor for performing lossless and/or lossy data compression, an image resolution reducer, a bit depth reducer, and a color reducer. An identified image file may be provided to one of the file reducer components and the output of the component stored in secondary storage or the output may be provided to another file reducer component for further file reduction. The data compressor may perform lossless or lossy compression on a file using any known data compression method. The image resolution reducer may be used to reduce the number of pixels or lines used to represent an image. The bit depth reducer may be used to reduce the number of bits used to represent a pixel. The color reducer may be used to convert a color image from one format to another format that uses less data to represent color data in the image. For example, a four color CMYK image may be reduced to a three color image such as CIE L*a*b, CIE L*u*v, CIE XYZ, RGB, or any other known three color image representation. Other color reductions include reductions to duotone images, color palette representations, or even grayscale images.

The file selector compares metadata regarding a file to one or more thresholds to identify a file for downgrading. In one implementation, metadata corresponding to the last time a file was accessed may be compared to an access time threshold. If the length of time since the last file access exceeds the access time threshold, the file is identified for purposes of downgrading. The file selector may identify files by comparing metadata corresponding to the frequency of file access during a time period to an access frequency threshold. If the access frequency is less than the frequency threshold then the file selector identifies the file for downgrading. The file selector may also select a threshold in accordance with file classification metadata that may correspond to the purposes for which the image files are stored on the computer. The system of the present invention may be implemented in a host computer system, in an ancillary system directly coupled to the host system, or a more remotely coupled system such as a backend server.

The system and method of present invention may be applied to more levels of storage than secondary and tertiary storage. For example, the first level of storage for a host system may be its internal memory, its secondary level may be an associated disk system, its tertiary level a backend server, and further levels supported by distributed storage sites or archival services. The system and method of the present invention may be extended to maintain different levels of downgraded versions at the various storage levels in the system without departing from the principles of the present invention.

The above described features and advantages, as well as others, will become more readily apparent to those of ordinary skill in the art by reference to the following detailed description and accompanying drawings.

DETAILED DESCRIPTION

Figure 1:
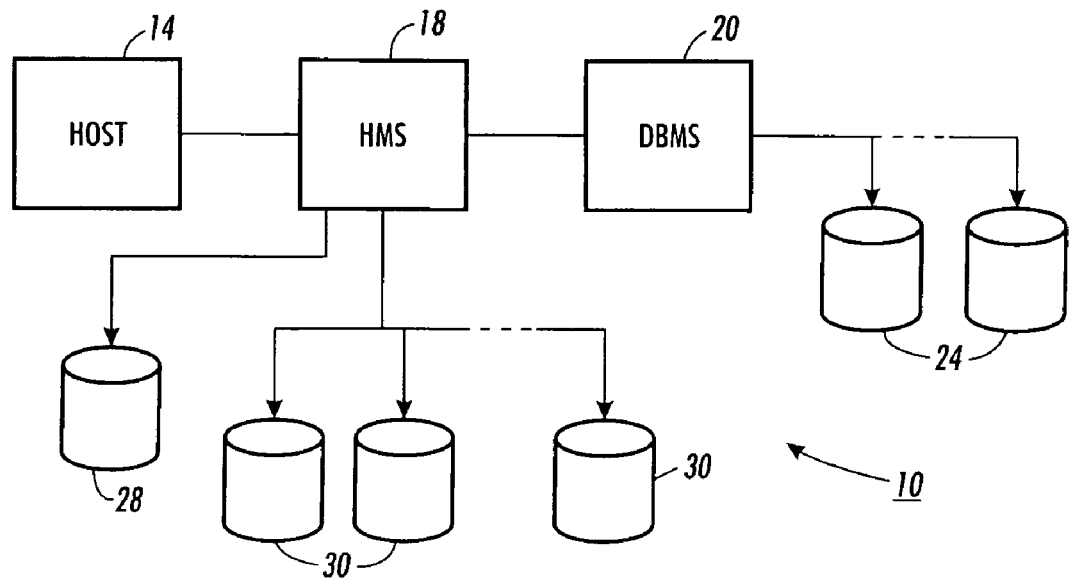
FIG. 1 shows a block diagram of a system in which the image file downgrading method may be implemented.

FIG. 1 shows a system 10 in which the principles of the present invention may be implemented. System 10 includes a host system 14 that is coupled to a hierarchical management system (HMS) 18 and a database management system (DBMS) 20. Coupled to DBMS 20 are one or more volumes 24 of secondary storage for host system 14. These volumes may be hard disks, a redundant array, or other relatively short access time storage for files that support the operations of host system 14. HSM 18 is coupled to a file data volume 28 and one or more volumes 30 of tertiary storage. Volumes 30 may be magneto-optical disks, tape drives, or other relatively long access time storage for files.

In system 10, HSM 18 intercepts queries or store commands for files from host system 14 to determine whether the file exists on a volume 24 of secondary storage or a volume 30 of tertiary storage. This determination is made with reference to the file metadata stored on file data volume 28. If the file exists on a secondary storage volume, HSM 18 allows the query or command to pass through to DBMS 20 for processing. If the file exists on a tertiary storage volume, HSM 18 retrieves the file from tertiary storage and provides the file to host system 14. HSM 18 also commands DBMS 20 to store the file in secondary storage. HSM 18 uses the message traffic between host system 14 and DBMS 20 to update the file metadata stored in data volume 28. This file metadata includes data regarding the time of file access, the storage location for the file, and the type of data stored in the file.

Typically upon some periodic basis, HSM 18 compares the metadata stored in file data volume 28 with access thresholds to determine whether a file stored on a volume 24 of secondary storage should migrate to a volume 30 of tertiary storage. In previously known systems, the time since the last file access, the frequency of file access during a time period, or the like was used to determine that a file should be moved from secondary storage to tertiary storage so the file could be deleted from secondary storage. In this manner, secondary storage was more likely to contain files that were demonstrably related to the operation of host system 14 while files less important to its operation were maintained in tertiary storage. When a file was accessed from tertiary storage, HSM 18 also restored the file to secondary storage. The migration of files between secondary and tertiary storage was used to update the metadata for the files. This type of HSM processing was performed in previously known HSM systems.

The HSM system of the present invention detects image files and controls the migration of image files in a manner not previously used by HSM systems. Specifically, HSM 18 of the present invention identifies image files on a volume 24 of secondary storage and downgrades those files so they may continue to be stored on a volume 24 of secondary storage. However, the downgrading of the file results in a smaller file that accommodates the need for space in secondary storage without sacrificing access time. Preferably, a full resolution copy of the image file is stored in tertiary storage before the file is downgraded. This preserves the original full resolution image in the event that the downgraded version is inadequate for the program that requested the image file.

HSM 18 may be implemented with resources of host system 14. That is, it may be a terminate and stay resident (TSR) program or daemon in host system 14. In another embodiment, HSM 18 may be implemented in a separate computer system having its own processor and memory. This separate computer system may be coupled directly to host system 14 through a serial or parallel port of system 14. In yet another embodiment, HSM 18 may be implemented in a backend server that is coupled to host system 14 through a network. In this embodiment, HSM 18 may be remotely located from host system 14. The media coupled to HSM 18 may be organized in a hierarchical manner and coupled to HSM 18 either directly or indirectly. For example, the backend server implementation may be coupled to storage media directly to form another level of storage for host system 14 and the backend server may also be indirectly coupled to other storage media through other network servers to form additional levels of storage for host system 14. Thus, HSM 18 may be local or remote from host system 14 and HSM 18 may control and downgrade image files through many levels of media storage beyond secondary and tertiary storage.

Figure 2:
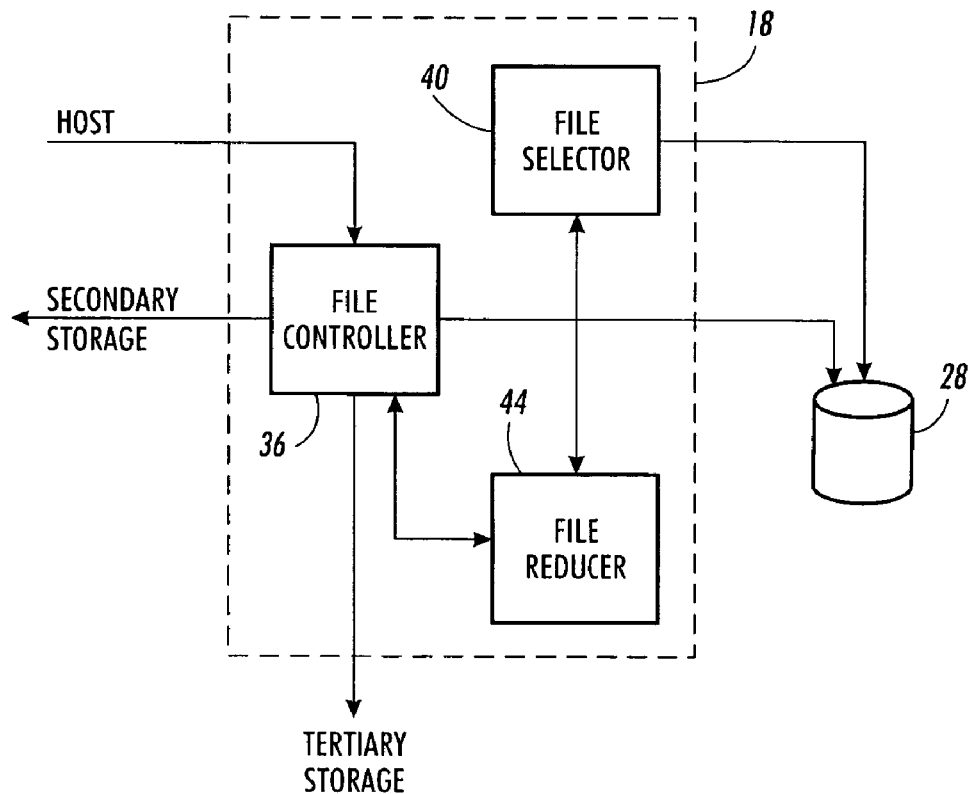
FIG. 2 shows a block diagram of a system for downgrading image files.

As shown in FIG. 2, HSM 18 is comprised of a file controller 36, an image file selector 40, and a file reducer 44. File controller 36 performs the functions of arbitrating requests for files and determining whether a requested file is stored in secondary or tertiary storage. File controller 36 is coupled to file data volume 28 to obtain file metadata to support these functions. File selector 40 on a periodic or scheduled basis retrieves file metadata for image files from file data volume 28 and compares that data to various thresholds to determine whether the image files should be downgraded. File selector 40 provides the identification of image files selected for downgrading and the downgrade level to file reducer 44. File reducer 44 requests the identified file from file controller 36. File controller 36 retrieves the appropriate version of the image file from storage and provides it to file reducer 44 for downgrading. After file reducer 44 performs the appropriate actions on the image file that correspond to the downgrade level, the downgraded file is provided to file controller 36 for storage and the updating of the metadata for the file.

The components of HSM 18 shown in FIG. 2 may be implemented as a separate processor with memory for performing the file management functions. In this embodiment, HSM 18 may be on the same bus as host system 14 or coupled to the same network through which host system 14 communicates with DBMS 20 to retrieve files. Preferably, the components of HSM 18 may be part of the operating system for host 14 as computer programs that are executed as terminate and stay resident (TSR) programs. Alternatively, HSM 18 may be implemented as a daemon that operates on operating system file data to perform its functions. In yet another possible implementation of the present invention, a file format may be developed as an active object that handles its own file degradation in accordance with the method discussed below.

Figure 3:
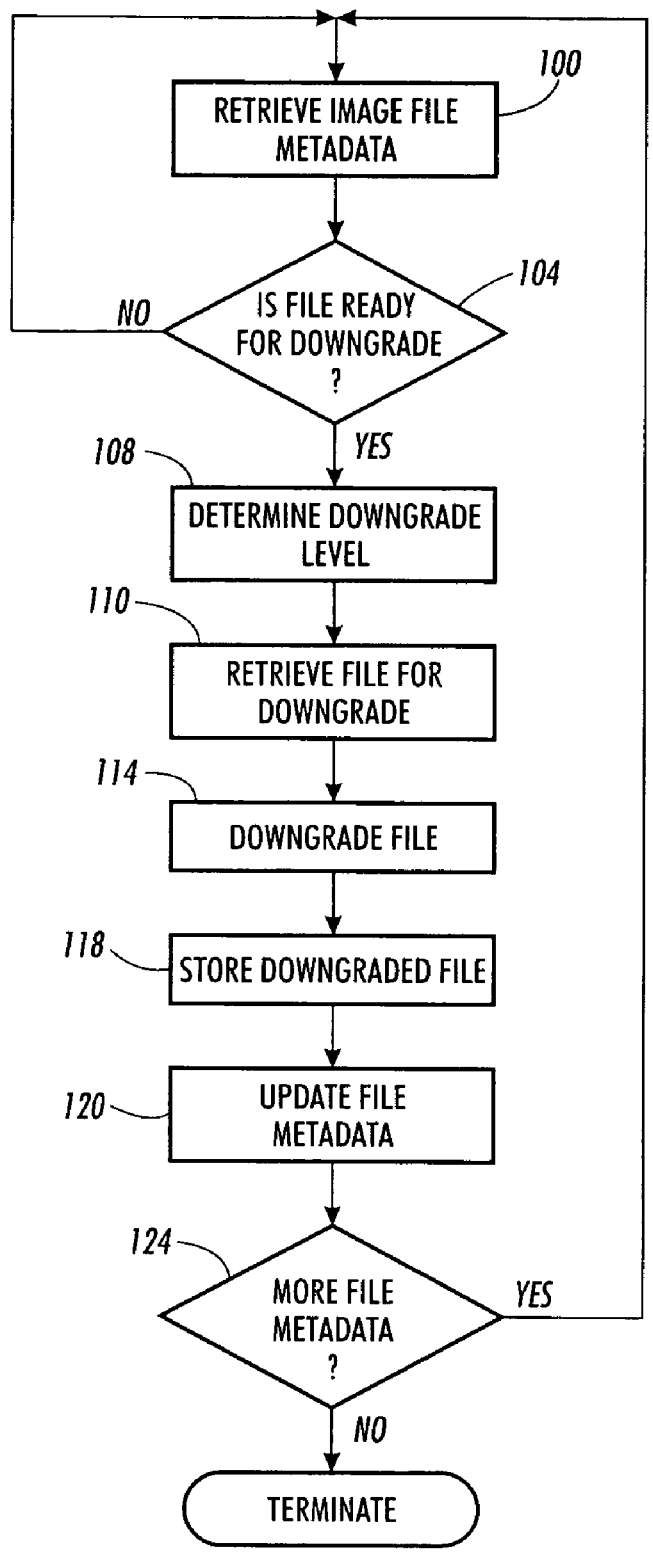
FIG. 3 is a flow diagram of an exemplary method for downgrading image files in the system of FIG. 1.

An exemplary method for implementing the principles of the present invention is shown in FIG. 3. The method includes retrieving image file metadata (block 100). The metadata is then compared to one or more thresholds to determine whether the file is to be downgraded (block 104). These thresholds may include elapsed time since file creation date, elapsed time since last file access, number of times the file has been accessed during some time period, or the like. The criteria for threshold values are determined from image file metadata whether a full resolution of a file is required in secondary storage for support of host system 14. For example, another form of metadata threshold may include a classification that indicates the status of the image file for host system 14. In this example, the image file may be an image of a document that is being used to process an insurance claim. Once the claim has been finally adjudicated by host system 14, the full resolution version of the document may be stored in tertiary storage and a thumbnail version of the document maintained in secondary storage. Accordingly, threshold values used by the process may be related to classifications that correspond to the application programs executing on host system 14 and their use of the image files kept in secondary storage. Another example of classification data is file type. Some file types, such as medical image files, may be downgraded less aggressively than image files for report forms, sales documents, and the like.

If the metadata does not indicate that the file is ready for downgrading, the process continues by looking at other image file metadata (block 100). If the threshold for downgrading is met or exceeded, the process determines the level of downgrading that is required for the image file (block 108). An exemplary implementation of downgrade thresholds and their corresponding downgrade levels are shown in Table 1.

TABLE 1

| Time Image in System | Downgrade Level |
|---|---|
| 0 days | Original 600 spi, 36 bit/pixel uncompressed |
| 3 days | Reduce to 24 bit/pixel |
| 1 week | Reduce to JPEG with Q-factor 90 |
| 5 weeks | Reduce to JPEG with Q-factor 75 |
| 6 months | Reduce to 300 spi then JPG with Q-factor 75 |
| 1 year | Reduce to 8 bit/pixel grayscale then JPEG with Q-factor 75 |
| 5 years | Reduce to 200 spi image and compress using CCITT group 4 method |
| 10 years | Delete from system |

These downgrade levels and threshold values are merely exemplary. Other types of downgrade levels and threshold values may be used. For the example shown, the original image is a 600 spi resolution image that uses 36 bits per pixel and the image is stored in secondary storage in an uncompressed format. In one implementation of the present invention, file metadata regarding the creation of the file is generated by HSM 18 and stored in file data volume 28. When the process shown in FIG. 3 determines that the file has been stored in secondary storage for 3 days, the original image file is retrieved from secondary storage (block 110). A copy of the original file at its full resolution may be stored in tertiary storage in an uncompressed format and the corresponding file metadata for this version may be stored in file data volume 28. This is preferably done so that subsequent downgrades may be performed on the original image rather than previously downgraded images. However, if the irretrievable loss of data is permissible, a copy of the original image is not required and subsequent downgrades may be performed on previously downgraded versions of an image file.

Once the identified file is retrieved, the file may be downgraded in accordance with the corresponding download level (block 114). In the example set forth above regarding an image that has been stored for 3 days, the original image is reduced to one in which each pixel is represented by a 24 bit binary value. This reduction may be performed by mapping the pixel values over the 36 bit range into the pixels values covered by the 24 bit range. The downgraded file may then be stored in secondary storage (block 118) and the file metadata for the downgraded file stored in the file data volume 28 (block 120). The process continues by determining whether additional file metadata needs to be evaluated (block 124). If more files require evaluation, the process continues (block 100). Otherwise, the process terminates.

Other exemplary downgrade methods identified in Table 1 include JPEG compression. JPEG compression is a form of discrete cosine transform (DCT) compression and the Q-factor is a parameter for the performance of the compression. Other lossy compression methods may be used without departing from the principles of the present invention. For example, MPEG compression methods may be used as well as fractal compression methods. As previously noted, the original version is preferably maintained in tertiary storage so subsequent downgrade levels are performed on the original, although a subsequent downgrade may be performed on a previous downgraded version. If a lossy compression is performed on a lossy compressed version of an image file, the information content of the result may be too poor for any use. Consequently, the process shown in FIG. 3 may also include an entropy measurement to determine whether the downgraded version of the file should be stored in secondary storage or simply deleted from secondary storage.

Another exemplary downgrade method for an image file shown in Table 1 is a reduction in the resolution for the image. That is, the number of pixels per line or unit of measurement may be reduced for the image. The new pixels for the image having the smaller number of pixels may be generated by using a sliding window to interpolate new pixel values from surrounding pixel values. Alternatively, the downgraded image may be generated by selecting pixels from the original or previously downgraded image. Table 1 also includes a color downgrade operation corresponding to a time in storage of one year. In that event, the image file is downgraded from a color image to a grayscale image. This may be accomplished by any known method for converting color images to grayscale or other colorless images. Also as noted above, a downgrade level may be comprised of a combination of downgrade operations. For example, the resolution of an image may be reduced and then the resulting image compressed by a lossy compression method.

Other possible downgrading methods include lossless compression, color palette, binary imaging or the like. Lossless compression methods may be used to more efficiently store a version of an image file before resorting to a downgrading method that loses image data. Various methods of lossless compression may be used at different downgrade levels as some methods produce smaller file sizes while others are more computationally efficient. Color palette may be used as a color downgrade method. Color palette refers to a color encoding scheme in which a single byte is used to identify 256 colors with the binary range of 0 to 255. Thus, each color pixel is identified with a single byte having a binary value that identifies a single color at a predetermined intensity. Binary image files may be used for black and white images. Each pixel of a black and white image may be represented by a single bit. If the bit is a '1' then a black pixel of predetermined intensity is generated and if the bit is a '0' then a white pixel of predetermined intensity is generated. These and other methods of reducing file size may be used in conformance with the principles of the present invention.

In operation, an HSM system or operating system of a host system 14 is modified to include the file selector and file reducer of the present invention. Thereafter, the file selector on some scheduled basis retrieves file metadata and determines whether a file should be downgraded and, if so, the corresponding downgrade level for the selected file. The selected file is downgraded and the downgraded file is stored in secondary storage while the metadata for the file is updated to reflect the downgrade. The original image file may also be stored in tertiary storage for later retrieval to update the secondary storage or to provide the file data for a downgrade operation. In this manner, image files are reduced in size so they may be maintained in secondary storage without requiring the amount of storage space necessary for the original image or previously downgraded images. This system helps to keep image files available for a host system without significantly impacting secondary storage on a long term basis. Thus, the system and method of the present invention overcomes limitations of previously known HSM systems or operating systems.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method for managing image files in a host system comprising:
   identifying an image file stored in secondary storage for a host system;
   comparing file metadata for the identified image file to a downgrade threshold;
   reducing pixel size in the identified image file to generate a downgraded file in response to the comparison of the file metadata to the downgrade threshold;
   storing the downgraded file in the secondary storage of the host system; and
   storing the identified image file in tertiary storage of the host system, the tertiary storage of the host system having an access time that is greater than the access time for the secondary storage of the host system.

2. A method for managing image files in a host system comprising:
   identifying an image file stored in secondary storage for a host system;
   comparing file metadata for the identified image file to a downgrade threshold;
   converting a color image from one color format to another color format that requires less data to represent color in the identified image file to generate a downgraded file in response to the comparison of the file metadata to the downgrade threshold;
   storing the downgraded file in the secondary storage of the host system; and
   storing the identified image file in tertiary storage of the host system, the tertiary storage of the host system having an access time that is greater than the access time for the secondary storage of the host system.

3. The method of claim 2, the downgrading of the identified image file further comprising:
   converting a color image to a color palette version of the color image to generate the downgraded file.

4. A method for managing image files in a host system comprising:
   identifying an image file stored in secondary storage for a host system; comparing file metadata for the identified image file to a downgrade threshold;
   retrieving a full resolution version of the identified image file from tertiary storage;
   performing a downgrade operation on the full resolution version of the identified image file to generate a downgraded file in response to the comparison of the file metadata to the downgrade threshold; and
   storing the downgraded file in the secondary storage of the host system; and storing the identified image file in tertiary storage of the host system, the tertiary storage of the host system having an access time that is greater than the access time for the secondary storage of the host system.

5. A system for managing image files in a host system comprising:
- a file data volume for storing file metadata that corresponds to image files stored in a secondary storage for a host system;
- a file selector for retrieving file metadata from the file data volume and comparing the retrieved metadata to at least one downgrade threshold to identify an image file stored in the secondary storage of the host system for downgrading;
- a file reducer for downgrading the identified image file; and
- a file controller for generating file metadata for storage in the file data volume and for storing the downgraded file in the secondary storage of the host system and for storing the identified image file in tertiary storage of the host system, the tertiary storage for the host system having an access time that is greater than the access time for the secondary storage of the host system.

6. The system of claim 5 wherein the file reducer includes a compressor for compressing the identified image file.

7. The system of claim 5 wherein the file reducer includes a color reducer for converting a color image from one color format to another color format that uses less data to represent color.

8. The system of claim 5 wherein the file reducer includes an image resolution reducer for reducing resolution of the identified image file.

9. The system of claim 5 wherein the file reducer includes a pixel size reducer for reducing a number of bits to represent a pixel in the identified image file.

\* \* \* \* \*